(12) United States Patent
Paulus et al.

(10) Patent No.: US 6,207,744 B1
(45) Date of Patent: Mar. 27, 2001

(54) CURABLE POLYURETHANE POLYMER DISPERSION BASED ON THIS POLYMER, PROCESSING FOR PREPARING THE DISPERSION, AND ITS USE

(75) Inventors: Wolfgang Paulus, Mainz; Werner Lebkücher, Friedelsheim; Rainer Königer, Ludwigshafen; Wolfgang Reich, Maxdorf, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/267,139

(22) Filed: Mar. 11, 1999

(30) Foreign Application Priority Data

Mar. 12, 1998 (DE) ............................................. 198 10 793

(51) Int. Cl.⁷ ............................... C08J 3/00; C08K 3/20; C08L 75/00; C08F 8/30; C08F 283/04
(52) U.S. Cl. ......................... 524/507; 524/589; 524/590; 524/591; 524/839; 524/840; 525/123; 525/455
(58) Field of Search ..................................... 525/455, 123; 524/507, 589, 590, 591, 839, 840

(56) References Cited

U.S. PATENT DOCUMENTS

| | | |
|---|---|---|
| 4,357,221 | 11/1982 | Lehner et al. . |
| 4,722,966 | 2/1988 | Flakus . |
| 5,089,376 | 2/1992 | Setthacheyanon . |
| 5,135,963 | 8/1992 | Haeberle et al. . |
| 5,306,764 | 4/1994 | Chen . |
| 5,684,081 | 11/1997 | Dannhorn et al. . |

FOREIGN PATENT DOCUMENTS

| | | |
|---|---|---|
| 19525489 | 7/1995 | (DE) . |
| 0 209 684 | 1/1987 | (EP) . |
| 0 392 352 | 10/1990 | (EP) . |
| 0 753 531 | 1/1997 | (EP) . |
| 0 554 784 | 8/1998 | (EP) . |

OTHER PUBLICATIONS

Derwent Abstract, AN 86–107,514, DE 3,437,918, Apr. 17, 1986.
Derwent Abstract, AN 92,124,525, DE 4,031,732, Apr. 9, 1992.

Primary Examiner—Patrick D. Niland
(74) Attorney, Agent, or Firm—Oblon, Spivak, McClelland, Maier & Neustadt, P.C.

(57) ABSTRACT

The invention relates to a curable polyurethane polymer which comprises in copolymerized form A) from 40 to 80% by weight, based on the overall weight of components A) to F), of at least one hydroxyl-containing prepolymer having at least one free-radically or photochemically polymerizable $\alpha,\beta$-ethylenically unsaturated double bond, B) from 0.1 to 20% by weight, based on the overall weight of components A) to F), of at least one compound having at least one isocyanate-reactive hydroxyl group and/or primary or Secondary amino group and, in addition, at least one polar functional group, C) from 0.1 to 10% by weight, based on the overall weight of components A) to F), of at least one compound selected from diamines, polyamines and mixtures thereof, D) from 0 to 20% by weight, based on the overall weight of components A) to F), of at least one further compound other than A), B), C) and E), having at least two isocyanate-reactive groups, which are hydroxyl groups and mixtures of hydroxyl groups and/or primary or secondary amino groups, E) from 0 to 20% by weight, based on the overall weight of components A) to F), of at least one compound having an isocyanate-reactive group, F) from 10 to 50% by weight, based on the overall weight of components A) to F), of at least one polyisocyanate, and the salts thereof, wherein the sum of the hydroxyl numbers of components A) and D) lies within a range from 121 to 300 mg of KOH/g.

15 Claims, No Drawings

CURABLE POLYURETHANE POLYMER DISPERSION BASED ON THIS POLYMER, PROCESSING FOR PREPARING THE DISPERSION, AND ITS USE

The present invention relates to a curable polyurethane polymer which comprises in copolymerized form at least one hydroxyl-containing prepolymer having at least one α,β-ethylenically unsaturated double bond that can be free-radically polymerized by thermal or photochemical means. The invention additionally relates to an aqueous polymer dispersion which comprises such a curable polymer in dispersed form, to processes for preparing the dispersion, and to its use for producing coatings.

Aqueous polyurethane dispersions comprising components having ethylenically unsaturated groups have found broad application. They are used in particular to produce coatings on nonflexible substrates, such as wood, and on flexible substrates, such as leather. Owing to their capacity to crosslink, the films obtained from these dispersions have good performance properties, such as chemical resistance and enhanced mechanical stability, as compared with non-crosslinkable polyurethane dispersions. In addition, in order to produce coatings on substrates which have little or no ability to withstand thermal stress, it is common to employ polyurethane dispersions which are radiation curable. An important property of these dispersions which can be cured by UV radiation or by means of electron beams is that as soon as the water present has evaporated they produce films which give a highly tack-free surface which may already be able to withstand mechanical stress. On the one hand, this allows the coating even of those substrates whose exterior form means that they exhibit radiation shadow regions and hence for technical reasons are not entirely accessible to radiation curing. On the other hand, it means that the substrates can be worked on mechanically even prior to curing. This is particularly important in connection with the production of coatings on wood, since in this case the surfaces prior to curing are generally sanded in order, for example, to remove the erect wood fibers and, in a second, coating step, to obtain a smooth surface. Another advantage of these coatings is their freedom from tack, with the consequence that the surfaces do not stick to one another, for example, when the substrates are stacked.

DE-A-34 37 918 describes aqueous oligourethane dispersions with incorporated unsaturated groups and their use for producing highly lustrous coatings on leather. They are prepared by reacting an isocyanate-functional oligourethane prepolymer with a hydroxyl-containing ester of acrylic acid and/or methacrylic acid with at least dihydric aliphatic alcohols, such as hydroxyalkyl (meth)acrylates or di(meth) acrylic esters of 1,1,1-trimethylolpropane or glycerol.

EP-A-0 554 784 describes aqueous dispersions of a radiation-curable polyurethane whose structural components comprise isocyanurate- or biuret-functional polyisocyanates and polyols.

Evaporation of the water from these polyurethane dispersions produces coatings which before radiation curing are still not able to withstand mechanical stress and/or which produce tacky surfaces.

EP-A-0 209 684 describes storage-stable, radiation-curable, aqueous emulsions which are free from isocyanate groups and are based on ionic urethane urea acrylates. In order to prepare them, a cycloaliphatic polyisocyanate in an organic solvent is reacted first with a hydroxyalkyl acrylate and a polyhydroxy compound and then with sodium salts of aminocarboxylic acids and/or with aliphatic diamines, the product then being emulsified by adding water and removing the solvent by distillation. The mechanical properties of the films obtained from these dispersions are in need of improvement, especially as regards their sandability.

None of the abovementioned publications describes polymer dispersions based on polyurethanes which comprise in copolymerized form hydroxyl-containing prepolymers having α,β-ethylenically unsaturated double bonds.

U.S. Pat. No. 4,357,221 describes a process for coating electroconductive parts in which an anionic polyurethane adduct is employed that has α,β-ethylenically unsaturated, radiation-curable double bonds. This product is prepared by reacting a solution of a polyurethane based on an acrylic ester diol, a low- or high-molecular mass chain extender and a polyisocyanate with a salt of a mercaptocarboxylic acid. The carboxylate group is introduced into the polyurethane here by addition of the mercapto group not onto an isocyanate group but instead onto one of the double bonds in the polyurethane, so as to form a mercapto ether bridge. The resulting anionic polyurethanes have a higher content of ionic groups than is generally the case for film-forming binders, being at least 4%. The double bond values of the polyurethanes are stated with a theoretically possible range from 0.3 to 3 mol per 1000 g of polyurethane, although the specific working examples only embrace polyurethanes having double bond values of at most 0.96 mol per 1000 g.

DE-A-40 31 732 describes radiation-curable aqueous binder dispersions which feature A) from 5 to 95% by weight of a self-dispersible polyurethane containing not more than 2 mol of polymerizable ethylenically unsaturated groups per kg of polyurethane, B) from 5 to 95% by weight of a prepolymer or prepolymer mixture dispersible with the aid of C), containing from 1 to 10 mol of polymerizable ethylenically unsaturated groups per kg of prepolymer or prepolymer mixture, and C) from 0 to 30% by weight of a protective colloid.

Component A) per se is not an acrylate-containing prepolymer. The prepolymers B) can be polyesters, polyethers, polyepoxides or polyurethanes, which are added separately to the aqueous dispersions, and which therefore are not attached to the polyurethane component A). The content of polymerizable ethylenically unsaturated groups employed in the working examples for dispersion A) is not more than 0.32 mol/kg of the mixture of A), B) and C). In the working examples, the presence of a protective colloid is mandatory. The coatings obtained with the dispersions based on a mixture of A) and B) are in need of improvement as regards their performance properties. For instance, the pendulum hardness of the radiation-cured films of the working examples is at most 115 s.

EP-A-0 392 352 describes aqueous dispersions of polyurethanes which can be crosslinked by the action of high-energy radiation, comprising a) 1 gram equivalent of NCO of a polyisocyanate, b) from 0.1 to 0.8 gram equivalent of OH of a polyol having a molecular weight of between 400 and 6000 g/mol, c) from 0 to 0.8 gram equivalent of OH of a polyol having a molecular weight of between 62 and 399 g/mol, d) from 0 to 0.4 gram equivalent of NH of a polyamine having at least two isocyanate-reactive amino groups, e) from 0 to 0.4 gram equivalent of OH of an amino alcohol having at least one isocyanate-reactive amino group, f) from 0.05 to 0.5 gram equivalent of OH or NH of a compound with ionic groups, or groups which can be converted into ionic groups, having at least one iosocyanate-reactive hydroxyl or amino group, g) from 0 to 0.2 gram equivalent of OH of a monofunctional polyetherol, and h) a compound having at least one ethylenically unsaturated group and at least one hydroxyl group, with the provisos that (i) the sum of the OH and NH gram equivalents is between 0.9 and 1.2, (ii) the components under a) to h) can be in the form of individual components or mixtures, and (iii) the ethylenically unsaturated component h) is employed in amounts of from 0.02 to 0.08 gram equivalent of OH. The content of polymerizable ethylenically unsaturated groups per 1000 g of polyurethane is therefore very low and is not more than 0.166 mol/kg.

DE-A-195 25 489 describes polyester acrylate urethane dispersions based on hydroxyl-containing polyester acrylate prepolymers. These dispersions are prepared by polyaddition of A) from 40 to 90% by weight of one or more hydroxyl-containing polyester acrylate prepolymers having an OH content of from 40 to 120 mg of KOH/g and B) from 0.1 to 20% by weight of one or more mono- and/or difunctional, isocyanate-reactive compounds which comprise cationic groups, anionic groups and/or groups which exert a dispersing action by means of ether units, with C) from 10 to 50% by weight of one or more polyisocyanates, and by subsequent reaction with D) from 0.1 to 10% by weight of one or more diamines and/or polyamines.

They are suitable for use as film-forming binders. As component A), however, the working examples use only prepolymers having hydroxyl numbers of from 80 to 82 mg of KOH/g. The content of polymerizable, ethylenically unsaturated groups is not disclosed. The coatings obtained with these dispersions are in need of improvement in terms of their performance properties. For instance, the films as yet uncured by radiation have an inadequate pendulum hardness; in other words, under a mechanical load the coated substrates adhere to one another and to other uncoated surfaces, and surface damage may remain when the substrates are subsequently separated. This is a disadvantage in particular if the dispersions as described above are used to coat surfaces which have shadow regions that are difficult to access on radiation curing. The cured films as well are in need of improvement in terms of their mechanical properties, especially in terms of a satisfactory combination of surface hardness with film flexibility.

It is an object of the present invention to provide aqueous dispersions of curable polyurethane polymers whose dried films, uncured by radiation, possess good pendulum hardness. It is desirable, furthermore, that the uncured films should be able to withstand mechanical stress and hence exhibit high hardness and/or high scratch resistance. The radiation-cured films should be of high hardness and/or good flexibility.

We have found that this object is achieved by aqueous polymer dispersions comprising at least one curable polyurethane which comprises at least one hydroxyl-containing prepolymer having at least one free-radically or photochemically polymerizable α,β-ethylenically unsaturated double bond, the hydroxyl number of the prepolymer and of any other hydroxyl-containing component lying within a range from 121 to 300 mg of KOH/g. We have also found that the uncured and cured films acquire good mechanical properties if the hydroxyl-containing prepolymer employed is a reaction product, or a mixture, which comprises an epoxy acrylate.

The present invention hence provides a curable polyurethane polymer which comprises in copolymerized form A) from 40 to 80% by weight, based on the overall weight of components A) to F), of at least one hydroxyl-containing prepolymer having at least one free-radically or photochemically polymerizable α,β-ethylenically unsaturated double bond, B) from 0.1 to 20% by weight, based on the overall weight of components A) to F), of at least one compound having at least one isocyanate-reactive hydroxyl group and/or primary or secondary amino group and, in addition, at least one polar functional group, C) from 0.1 to 10% by weight, based on the overall weight of components A) to F), of at least one compound selected from diamines, polyamines and mixtures thereof, D) from 0 to 20% by weight, based on the overall weight of components A) to F), of at least one further compound other than A), B), C) and E), having at least two isocyanate-reactive groups, which are hydroxyl groups and mixtures of hydroxyl groups and/or primary or secondary amino groups, E) from 0 to 20% by weight, based on the overall weight of components A) to F), of at least one compound having an isocyanate-reactive group, F) from 10 to 50% by weight, based on the overall weight of components A) to F), of at least one polyisocyanate, and the salts thereof, wherein the sum of the hydroxyl numbers of components A) and D) lies within a range from 121 to 300 mg of KOH/g.

The sum of the hydroxyl numbers of components A) and D) preferably lies within a range from 123 to 250 mg of KOH/g, in particular from 125 to 220 mg of KOH/g, especially from 125 to 200 mg of KOH/g and, more especially, from 125 to 180 mg of KOH/g.

The polymers of the invention comprise component A) in general in a proportion of from about 50 to 75% by weight, preferably from about 50 to 70% by weight and, especially, from about 50 to 60% by weight, based on the overall weight of components A) to F), in copolymerized form. In a preferred embodiment the hydroxyl number of the prepolymer A) lies within a range from about 121 to 300 mg of ROH/g, preferably from about 125 to 215 mg of KOH/g, with particular preference from about 130 to 200 mg of KOH/g, especially from about 135 to 180 mg of KOH/g, and, more especially, from about 140 to 170 mg of KOH/g. In this case, if desired, it is possible to dispense with the use of a component D) in the polymers of the invention. In one possible embodiment, however, these polymers may also include a prepolymer A) having a hydroxyl number of at least 121 mg of KOH/g and in addition a component D).

The content of polymerizable, α,β-ethylenically unsaturated double bonds lies within a range from 1.0 to 4.0 mol per 1000 g of polymer, preferably from 1.1 to 3.8 mol in particular from 1.2 to 3.5 mol, especially from 1.5 to 3.3 mol and, more especially, from 2.0 to 3.2 mol per 1000 g of polymer.

The content of polar functional groups of the polymers of the invention lies in general within a range from about 1.3 to 3.5%, preferably from 1.5 to 3.3% by weight.

The K value of the prepolymer prior to dispersion and chain extension, determined by the method of E.

Fikentscher, Cellulose-Chemie 13 (1932), 58–64, on a 1% strength solution in dimethylformamide, lies within a range from about 20 to 70, preferably from 30 to 60 and, in particular, from 45 to 55.

Suitable hydroxyl-containing prepolymers A) having at least one free-radically or photochemically polymerizable α,β-ethylenically unsaturated double bond are selected from polyester acrylates, polyether acrylates, polyurethane acrylates, epoxy acrylates and mixtures thereof.

Examples of suitable polyester acrylates are the polycondensation products of α,β-ethylenically unsaturated mono- and/or dicarboxylic acids and their anhydrides with polyesterpolyols. Examples of α,β-ethylenically unsaturated mono- and/or dicarboxylic acids and their anhydrides which can be employed are acrylic acid, methacrylic acid, fumaric acid, maleic acid, maleic anhydride, crotonic acid, itaconic acid, etc. It is preferred to employ acrylic acid and methacrylic acid. Suitable polyesterols are linear and branched polymers having terminal OH groups, examples being those having at least two OH end groups. The polyesterols can be simply prepared by esterifying aliphatic, cycloaliphatic and aromatic di-, tri- and/or polycarboxylic acids with di-, tri- and/or polyols. Examples of suitable carboxylic acids are dicarboxylic acids having 2 to 20 carbon atoms, preferably 4 to 15 carbon atoms, examples being malonic acid, succinic acid, adipic acid, glutaric acid, pimelic acid, suberic acid, sebacic acid, dodecanedioic acid, phthalic acid, terephthalic acid, isophthalic acid, cyclohexanedicarboxylic acid, etc. Also suitable are sulfosuccinic acid and sulfoisophthalic acid. The dicarboxylic acids can be employed individually or as mixtures. Examples of suitable diols are glycols, preferably glycols having 2 to 25 carbon atoms. Examples of suitable glycols are 1,2-ethanediol, 1,3-propanediol, 1,4-butanediol, 1,5-pentanediol, 1,6-hexanediol, 1,10-decanediol, diethylene glycol, 2,2,4-trimethylpentane-1,5-diol, 2,2-dimethylpropane-1,3-diol, 1,4-dimethylolcyclohexane, 1,6-dimethylolcyclohexane and ethoxylated/propoxylated products of 2,2-bis(4-hydroxyphenyl)-propane (bisphenol A), etc. Suitable triols and polyols have, for example, 3 to 25 carbon atoms, preferably 3 to 18 carbon atoms. Examples include glycerol, trimethylolpropane, erythritol, pentaerythritol, sorbitol and their alkoxylates, etc. Suitable polyesterols can also be prepared by polymerizing lactones: for example, lactones having 3 to 20 carbon atoms. Examples of suitable lactones for preparing the polyesterols are α,α-dimethyl-β,-propiolactone, γ-butyrolactone, ε-caprolactone, etc.

Further suitable polyesteracrylates include condensation products based on hydroxyl-containing esters of acrylic acid and/or methacrylic acid with at least dihydric alcohols. Examples thereof include 2-hydroxyethyl acrylate, 2-hydroxyethyl methacrylate, 2-hydroxypropyl acrylate, 2-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy- 2-ethylhexyl methacrylate, di(meth)acrylic esters of 1,1,1-trimethylolpropane or of glycerol. These hydroxyl-containing esters can be polycondensed with polyesterols having terminal carboxyl groups, or with the dicarboxylic acids and glycols which form these polyesterols, to give polyester acrylates.

Examples of suitable polyether acrylates A) are the polycondensation products of the abovementioned α,β-ethylenically unsaturated mono- and/or dicarboxylic acids and their anhydrides with polyetherols. Polyetherols which can be employed here are linear or branched substances having terminal hydroxyl groups containing ether bonds and possessing a molecular weight in the range from, for example, about 500 to 10,000, preferably from 600 to 5000. Suitable polyetherols can easily be prepared by polymerizing cyclic ethers such as tetrahydrofuran or by reacting one or more alkylene oxides having 2 to 4 carbon atoms in the alkyl radical with a starter molecule which contains two active hydrogen atoms bonded in the alkylene radical. Examples of alkylene oxides are ethylene oxide, 1,2-propylene oxide, epichlorohydrin, 1,2- and 2,3-butylene oxide. The alkylene oxides can be employed individually, alternately in succession or as a mixture. Examples of suitable starter molecules are water, the abovementioned glycols, polyesterols, triols and polyols, amines, such as ethylenediamine, hexamethylenediamine and 4,4'-diaminodiphenylmethane, and also amino alcohols, such as ethanolamine. Like the polyesterols, the polyetherols too can be used alone or in mixtures.

Examples of suitable polyurethane acrylates A) are the polyaddition products of the polyisocyanates described below as component F) with the above-described hydroxyl-containing esters of acrylic and/or methacrylic acid with at least dihydric alcohols. As the polyisocyanates employed here preference is given to diisocyanates, such as 2,4- and 2,6-tolylene diisocyanate (TDI) and isomer mixtures thereof, tetramethylxylylene diisocyanate (TMXDI), tetramethylene diisocyanate, hexamethylene diisocyanate (HDI) and its trimers, isophorone diisocyanate (IPDI), trimethylhexamethylene diisocyanate, dicyclohexylmethane diisocyanate ($H_{12}$MDI), xylene diisocyanate (XDI) and diphenylmethane diisocyanate (MDI). Preferred hydroxyl-containing esters of acrylic acid and/or methacrylic acid are the abovementioned hydroxyalkyl (meth)acrylates, preferably hydroxymethyl acrylate, hydroxypropyl acrylate and hydroxyethyl methacrylate.

Examples of suitable epoxy acrylates A) are the reaction products of diglycidyl ethers with the abovementioned α,β-ethylenically unsaturated mono- and/or dicarboxylic acids and their anhydrides. Acrylic acid and/or methacrylic acid are preferably employed. Glycidyl ethers are obtained by reacting an alcohol component with an epoxy compound that has an appropriate leaving group in the position α to the epoxide group. Diglycidyl ethers are generally prepared from an aliphatic, cycloaliphatic or aromatic diol and epichlorohydrin as epoxy component. Aliphatic diols suitable for preparing glycidyl ethers are the abovementioned glycols, preferably 1,4-butanediol. Bisphenol A is preferably employed as aromatic diol. Depending on the molar proportion of epoxy compound to diol component it is possible in this reaction to obtain either diglycidyl ethers or, with an increasing amount of diol, hydroxyl-containing diepoxides of higher molecular mass. To prepare epoxy acrylates which are employed as sole hydroxyl-containing prepolymer A), the molar proportion of epoxy compound to diol component is chosen so that final reaction with the α,β-ethylenically unsaturated carboxylic acid component gives an epoxy acrylate having a hydroxyl number which is in accordance with the invention.

According to a preferred embodiment, the prepolymer A) is a reaction product or a mixture of
  a) at least one polyester acrylate and/or polyether acrylate and/or polyurethane acrylate and
  b) at least one epoxy acrylate.

If the compound employed as prepolymer A) is a reaction product of at least one polyester acrylate and/or polyether acrylate and/or polyurethane acrylate and an epoxy acrylate, then as starting materials it is also possible to employ components having a hydroxyl number less than 121 mg of KOH/g if the hydroxyl number of the resulting prepolymers A) lies within the above-described range from 121 to 300 mg of KOH/g. In this case it is possible to employ epoxy acrylates based on the abovementioned diglycidyl ethers and based on epoxy novolacs, epoxidized oils, such as soya oil or linseed oil, etc. Preferred epoxy acrylates employed are the reaction products of one mole of a bisphenol A diglycidyl ether (e.g. Epikote® 828 from Shell) with two moles of acrylic acid or methacrylic acid. The hydroxyl number of Epikote® 828 diacrylate is about 215 mg of KOH/g.

Polyester acrylates, polyether acrylates, polyurethane acrylates and epoxy acrylates are described, for example, in N. S. Allen, M. A. Johnson, P. Oldring (ed.) and M. S. Salim, Chemistry & Technology of UV&EB-Curing Formulations for Coatings, Inks & Paints, Vol. 2, SITA Technology, London 1991.

The polyurethane comprises the active dispersing component B), which has at least one isocyanate-reactive hydroxyl and/or amino group and additionally at least one polar functional group, in a proportion of in general from 0.1 to 20% by weight, preferably from 1.0 to 10% by weight and, in particular, from 2.0 to 8% by weight, based on the overall weight of components A) to F), in copolymerized form. Said component B) is selected from substances having at least one polar functional group selected from ionogenic and/or ionic groups, preferably carboxylic acid groups, sulfonic acid groups, phosphoric acid groups, phosphoric acid groups, the alkali metal salts and ammonium salts thereof, amino groups, quaternary amino groups and ether groups.

Suitable compounds B) comprise the abovementioned ionogenic and/or ionic groups and/or ether groups, which promote the dispersion of the polyurethanes in water. The ionogenic and/or ionic groups are preferably carboxylic acid groups and/or sulfonic acid groups and/or nitrogen-containing groups (amines) and/or carboxylate groups and/or sulfonate groups and/or quaternized or protonated groups. As component B) it is therefore possible to employ, for example, hydroxycarboxylic acids, such as hydroxyacetic acid (glycolic acid), hydroxypropionic acid (lactic acid), hydroxysuccinic acid (malic acid) and, preferably, dimethylolpropanoic acid.

Suitable compounds B) which have at least one sulfonic acid group or a sulfonate as polar functional group are, for example, the diesterdiols or polyesterdiols of dicarboxylic acids which additionally possess at least one sulfonic acid group or metal sulfonate group with the diols mentioned above as starting materials for the prepolymers A). Examples of suitable dicarboxylic acids in this context are sulfosuccinic acid, 4-sulfophthalic acid, 5-sulfoisophthalic acid, sulfoterephthalic acid, 4-sulfonaphthalene-2,7-dicarboxylic acid, 5-(4-sulfo-phenoxy)terephthalic acid or the corresponding metal sulfonates. It is preferred to employ the alkali metal salts of the abovementioned sulfodicarboxylic acids, especially the sodium and potassium salts. Particular preference is given to 5-sodium dihydrogen isophthalate, 5-potassium dihydrogen isophthalate, sodium dihydrogen terephthalate and potassium dihydrogen terephthalate. Other suitable compounds B) which have at least one sulfonic acid group or sulfonate group are correspondingly substituted straight-chain or branched aliphatic, cycloaliphatic or aromatic diols. Examples of these include 2-sulfo-1,4-butanediol, 2,5-dimethyl-3-sulfo-2,5-hexanediol and their sodium and potassium salts.

It is also possible to use compounds B) of the formulae

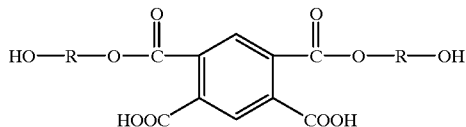

and/or

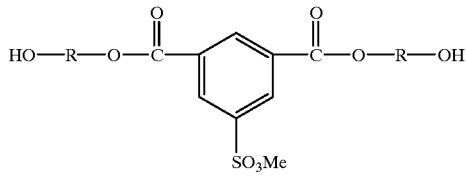

where each R is a $C_2$–$C_{18}$-alkylene group and Me is Na or K.

Also suitable for use as component B) are compounds of the formulae

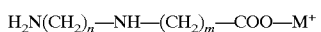

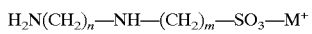

where m and n independently of one another are an integer from 1 to 8, in particular from 1 to 6, and M is hydrogen, Li, Na, K or ammonium. In the compounds, m and n are preferably 2.

If compounds with nitrogen-containing groups are used as component B), cationic polyurethanes are obtained. Examples of components B) which can be used are compounds of the formulae.

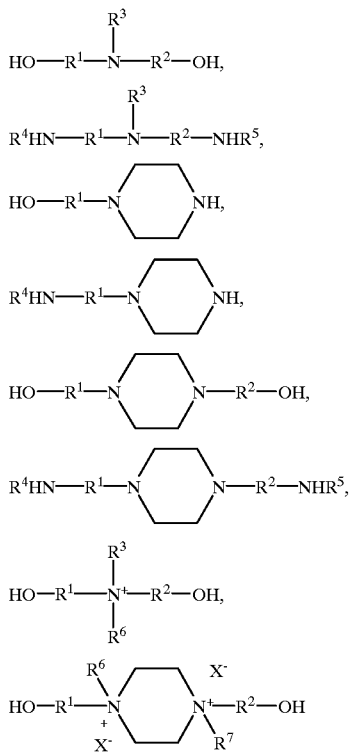

where $R^1$ and $R^2$, which can be identical or different, are $C_2$–$C_8$-alkylene, $R^3$, $R^6$ and $R^7$, which can be identical or different, are $C_1$–$C_6$-alkyl, phenyl or phenyl- $C_1$–$C_4$-alkyl, $R^4$ and $R^5$, which can be identical or different, are H or $C_1$–$C_6$-alkyl, X- is an anion, preferably chloride, bromide, iodide, $C_1$–$C_6$-alkyl sulfate or $SO_4^{2-}/2$.

In another suitable embodiment component (B) is an amine of the formula:

$$R^{10}HN\text{—}Y\text{—}SO_3H$$

where

Y is o-, m- or p-phenylene or straight-chain or branched $C_2$–$C_6$-alkylene which is unsubstituted or substituted by 1, 2 or 3 hydroxyl groups, and $R^{10}$ is a hydrogen atom, a $C_1$–$C_{12}$-alkyl group (preferably $C_1$–$C_{10}$- and in particular $C_1$–$C_6$-alkyl group) or a $C_5$–$C_6$-cycloalkyl group, it being possible for the alkyl or cycloalkyl group to be substituted, if desired, by 1, 2 or 3 hydroxyl, carboxyl or sulfonic acid groups.

The amine of the above formula is preferably taurine, N-(1,1-dimethyl-2-hydroxyethyl)-3-amino-2-hydroxypropanesulfonic acid or 2-aminoethylaminoethanesulfonic acid.

In a further suitable embodiment the amine is a customary α-, γ- or γ-amino acid, for example, glycine, alanine, valine, leucine, isoleucine, phenylalanine, tyrosine, proline, hydroxyproline, serine, threonine, methionine, cysteine, tryptophan, β-alanine, aspartic acid or glutamic acid.

The polyurethanes containing acid groups can be converted by neutralization (partial or complete) into a water-dispersible form. Bases used for the neutralization can be alkali metal bases, such as sodium hydroxide, potassium hydroxide, sodium carbonate, sodium hydrogen carbonate, potassium carbonate or potassium hydrogen carbonate, and alkaline earth metal bases, such as calcium hydroxide, calcium oxide, magnesium hydroxide or magnesium carbonate, and also ammonia and amines, such as trimethylamine, triethylamine, triisopropylamine, etc. The polyurethanes containing acid groups can also be neutralized using mixtures of two or more bases, examples being mixtures of an alkali metal hydroxide such as sodium hydroxide and an amine such as triisopropanolamine. Neutralization can be carried out, if desired, partially, to an extent for example of from 10 to 99%, such as from 20 to 80%, or completely, i.e. to an extent of 100%.

Charged cationic groups can be generated from the existing tertiary amine nitrogen atoms either by protonation, with carboxylic acids such as acetic acid, propionic acid, butyric acid and lactic acid, for example, or by quaternization, with alkylating agents such as $C_1$–$C_4$-alkyl halides or $C_1$–$C_4$-alkyl sulfates, for example. Examples of such alkylating agents are ethyl chloride, ethyl bromide, methyl chloride, methyl bromide, dimethyl sulfate and diethyl sulfate.

The compounds suitable as component B) which have only one isocyanate-reactive group act as stoppers to interrupt the polyaddition. When preparing the polymers of the invention, they can be added, if desired, at the end of the polyaddition reaction in order to convert at least some of any remaining free isocyanate groups.

It is preferred to employ as component B) compounds which have at least two isocyanate-reactive groups, examples being amino and/or hydroxyl groups, and at least one further polar functional group.

As compounds B) it is also possible to employ the polyetherols, described above as a component of the prepolymers A), which are based on cyclic ethers and alkylene oxides. Also suitable are α,ω-diamino polyethers, which are obtainable, for example, by reacting the polyetherols with ammonia. Examples of further suitable compounds B) are trimethylolpropane alkoxylated, for example, on one hydroxyl group, the alkoxylate residue featuring a terminal carboxylate or sulfonate group. The alkoxylate residue here can comprise in incorporated form, for example, ethylene oxide, propylene oxide and mixtures thereof. The molecular weight of these compounds lies within a range from about 500 to 2000. They are obtainable, for example, as Tegomer® grades from Goldschmidt.

The polyurethanes comprise in copolymerized form as component C) at least one compound selected from diamines, polyamines and mixtures thereof in a proportion of from about 0.1 to 10% by weight, preferably from 0.5 to 7% by weight, based on the overall weight of components A) to F).

Suitable amines C) are straight-chain and branched, aliphatic and cycloaliphatic amines having in general about 2 to 30, preferably about 2 to 20 carbon atoms. Examples thereof include ethylene diamine, 1,2-diaminopropane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, diethylenetriamine, triethylenetetramine, 4-azaheptamethylenediamine, N,N'-bis(3-aminopropyl) butane-1,4-diamine, and mixtures thereof. Suitable polyamines C) generally have a number-average molecular weight of from about 400 to 10,000, preferably from about 500 to 8000. Examples of these include polyamides having terminal primary or secondary amino groups, polyalkylenimines, preferably polyethylenimines, and vinylamines obtained by hydrolysis of poly-N-vinylamides, such as poly-N-vinylacetamide, and also the abovementioned α,ω-diamines based on aminated polyalkylene oxides. Copolymers which contain α,β-ethylenically unsaturated monomers with appropriate functional groups, examples being aminomethyl acrylate, aminoethyl acrylate, (N-methyl)aminoethyl acrylate, (N-methyl)aminoethyl methacrylate, etc., in copolymerized form, are also suitable for introducing photochemically or free-radically curable double bonds into the polyurethanes.

In order to optimize still further the polymer properties, the polyurethanes can if desired comprise in copolymerized form as component D) at least one further compound having at least two isocyanate-reactive groups in a proportion of from 0.01 to 10% by weight, preferably from about 0.1 to 5% by weight, based on the overall weight of components A) to F).

As component D) it is possible, for example, to employ polyols whose molecular weight is generally within a range from about 62 to 399 g/mol. Examples of these include diols having 2 to 18 carbon atoms, preferably 2 to 10 carbon atoms, such as 1,2-ethanediol, 1,3-propanediol, 1,4-butanediol, 1,6-hexanediol, 1,5-pentanediol, 1,10-decanediol, 2-methyl-1,3-propanediol, 2-methyl-2-butyl-1,3-propanediol, 2,2-dimethyl-1,3-propanediol, 2,2-dimethyl-1,4-butanediol, 2-ethyl-2-butyl-1,3-propanediol, neopentyl glycol hydroxypivalate, diethylene glycol and triethylene glycol. Suitable triols and polyols of higher functionality are compounds having 3 to 25, preferably 3 to 18, and, with particular preference, 3 to 6 carbon atoms. Examples of triols which can be used are glycerol or trimethylolpropane. As polyols of higher functionality it is possible, for example, to employ erythritol, pentaerythritol and sorbitol. Also suitable are low molecular mass reaction products of the polyols: for example, those of trimethylolpropane with alkylene oxides, such as ethylene oxide and/or propylene oxide. These low molecular mass polyols can be used individually or as mixtures.

Further suitable components D) are amino alcohols having 2 to 16, preferably 3 to 6, carbon atoms, such as monoethanolamine, methyl- isopropanolamine, ethylisopropanolamine, methylethanolamine, 3-aminopropanol, 1-ethylaminobutan-2-ol, methylenediethanolamine, 4-methyl-4-aminopentan-2-ol and N-(2-hydroxyethyl)aniline, and mixtures thereof.

As component D) it is also possible to employ polyols of relatively high molecular mass, having a number-average molecular weight in the range from about 400 to 6000 g/mol, preferably from 500 to 4000 g/mol. Examples of these include the polyesterols, described above in connection with component A), which are based on aliphatic, cycloaliphatic and/or aromatic di-, tri- and/or polycarboxylic acids with di-, tri- and/or polyols, and also the lactone-based polyesterols. They also include the polyetherols, likewise described above in connection with component A), that are obtainable by polymerizing cyclic ethers or by reacting alkylene oxides with a starter molecule. Also included here, furthermore, are customary polycarbonates, known to the skilled worker, having terminal hydroxyl groups, which are obtainable by reacting the above-described diols or else bisphenols, such as bisphenol A, with phosgene or carbonic diesters. $\alpha,\omega$-Polyamidols are also suitable.

The abovementioned components D) can be employed individually or as mixtures.

The polyurethanes may comprise as component E) at least one further compound having an isocyanate-reactive group. This group can be a hydroxyl group or a primary or secondary amino group. The polyurethanes of the invention can comprise component E) in copolymerized form in an amount of from 0.01 to 10% by weight, preferably from 0.1 to 5% by weight, based on the overall amount of components A) to F).

Examples of compounds which can be employed as component E) are monofunctional alcohols, such as methanol, ethanol, n-propanol, isopropanol, etc. Other suitable components E) are amines having a primary or secondary amino group, such as methylamine, ethylamine, n-propylamine, isopropylamine, dimethylamine, diethylamine, di-n-propylamine, diisopropylamine, etc.

Component E) may also comprise monohydric polyether alcohols having a number-average molecular weight in the range from about 500 to 10,000 g/mol, preferably from 1000 to 5000 g/mol. Monohydric polyether alcohols are obtainable by alkoxylating monohydric starter molecules, such as methanol, ethanol or n-butanol, with the alkoxylating agent being ethylene oxide or mixtures of ethylene oxide with other alkylene oxides, especially propylene oxide.

By means of this component E) it is therefore possible for there to be polyethylene oxide segments, present if appropriate in terminal and/or pendant polyether chains, incorporated into the polyurethanes, these segments in addition to the ionic groups in the polyurethane influencing the hydrophilic character.

The compounds of the type specified, with polyethylene oxide units present within terminal and/or pendant polyether chains, are employed in amounts such that in the polyurethane dispersions there can be from 0 to 10% by weight, preferably from 0 to 5% by weight, of polyethylene oxide units incorporated within terminal and/or pendant polyether chains in the polyurethanes. The overall amount of the hydrophilic structural units (ionic groups and ethylene oxide units of the latter type) is generally chosen so as to ensure the dispersibility of the polyurethanes in water.

The polyurethanes comprise in copolymerized form as component F) at least one polyisocyanate in a proportion of from about 10 to 50% by weight, preferably from about 15 to 45% by weight, based on the overall weight of components A) to F). Suitable polyisocyanates F) are selected from compounds having 2 to 5 isocyanate groups, isocyanate prepolymers with an average number of from 2 to 5 isocyanate groups, and mixtures thereof. Examples of these include aliphatic, cycloaliphatic and aromatic di-, tri- and polyisocyanates. Examples of suitable diisocyanates F) are tetramethylene diisocyanate, hexamethylene diisocyanate, 2,3,3-trimethylhexamethylene diisocyanate, 1,4-cyclohexylene diisocyanate, isophorone diisocyanate, 1,4-phenylene diisocyanate, 2,4- and 2,6-tolylene diisocyanate and their isomer mixtures (e.g. 80% 2,4 and 20% 2,6 isomer), 1,5-naphthylene diisocyanate, 2,4- and 4,4'-diphenylmethane diisocyanate. An example of a suitable triisocyanate is triphenylmethane 4,4',4"-triisocyanate. Also suitable are isocyanate prepolymers and polyisocyanates obtainable by addition of the abovementioned isocyanates onto polyfunctional hydroxyl- or amino-containing compounds. Polyisocyanates which result from biuret or isocyanurate formation are additionally suitable. Preference is given to the use of hexamethylene diisocyanate, trimerized hexamethylene diisocyanate, isophorone diisocyanate, 2,4-tolylene diisocyanate, 2,6-tolylene diisocyanate, and mixtures thereof.

The invention additionally provides polymer dispersions which comprise at least one of the above-described polymers in dispersed form. The polyurethane dispersions of the invention are prepared by customary processes which are known to the skilled worker. These processes are described, for example, in Ullmann's Encyclopedia of Industrial Chemistry, 5th ed., Vol. A 21, VCH Weinheim, (1992), pp. 678–680. Examples include the spontaneous dispersion of polyurethane ionomers by the acetone process, prepolymer mixing processes, melt emulsion processes, etc. They also include the ketimine and ketazine process, and the dispersion of precursors, where hydrophilic oligomers are dispersed.

The molar proportion of isocyanate groups of component F) to isocyanate-reactive groups of components A) to E) lies in general within a range from about 09:1 to 1.2:1, preferably from about 0.95:1 to 1.1:1.

To prepare the novel, curable, aqueous polymer dispersions it is possible, for example, first of all to react components A), B), F) and, if desired, D) and/or E) in the melt or in the presence of an inert, water-miscible solvent, such as acetone, tetrahydrofuran, methyl ethyl ketone or N-methylpyrrolidone, to give an isocyanate-functional polyurethane prepolymer. The reaction temperature in this case lies in general within a range from about 20 to 160° C., preferably from about 50 to 100° C. In carrying out the reaction it is possible, for example, to heat the batch at reflux under ambient pressure. To accelerate the addition reaction it is possible to employ known catalysts, such as dibutyltin dilaurate, tin(II) octoate, 1,4-diazabicyclo-[2.2.2]octane, or amines, such as triethylamine. To avoid unwanted premature polymerization of the $\alpha,\beta$-ethylenically unsaturated groups it is possible if desired to add polymerization inhibitors during the preparation of the polyurethane. Examples of suitable such inhibitors are quinones, phenols or phenol derivatives, such as p-benzoquinone, hydroquinone, p-methoxyphenol, phenothiazine, 2,2,6,6-tetramethylpiperidin-1-yloxy, 4-hydroxy-2,2,6,6- tetramethylpiperidin-1-yloxy, etc. Examples of suitable polymerization inhibitors are described in Encyclopedia of Polymer Science & Technology, Vol. 7, 1967, pp. 644–664, Verlag Wiley & Sons, New York-London-Sydney.

Following the preparation of the isocyanate-functional polyurethane prepolymer it is possible, if desired, to ionize the copolymerized ionogenic groups, as described above in connection with component B), by neutralization or quaternization. If the polymer dispersions of the invention are prepared using at least one compound having only one isocyanate-reactive group as sole or additional component B), then it is generally not added until toward the end of the reaction of the other components. If the polymers of the invention are prepared using a component E) which likewise has only one isocyanate-reactive group and hence acts as a stopper, then it is also generally not added until toward the end or after the reaction of the other components, and if desired not until component C) had been added.

Finally, the isocyanate-functional prepolymer is reacted with component C) to give the novel polyurethane, which is essentially free of isocyanate groups, this reaction involving an increase in molar mass. For this reaction, the polyurethane prepolymers containing isocyanate groups either can be introduced into the dispersion water comprising component C) or can have added to them a mixture of component C) and dispersion water. The amount of component C) here is chosen so that the resulting polyurethane is essentially free of isocyanate groups. If desired, the solvent can be removed by distillation following the addition of the dispersion water. The amount of dispersion water is chosen so as to give the resulting aqueous polyurethane dispersions a solids content of from about 10 to 70% by weight, preferably from about 20 to 60% by weight.

In general, the polyurethane polymers of the invention are self-dispersible, and so the use of an emulsifier and/or protective colloid can be dispensed with. It is, however, possible if desired to employ customary emulsifiers and protective colloids, known to the skilled worker, such as, for example, homopolymers and copolymers of vinyl pyrrolidone, etc.

The curable aqueous polymer dispersions of the invention are suitable preferably for producing coatings on, for example, flexible and possibly absorbent substrates, such as paper, cardboard or leather, or inflexible substrates of metal or plastic. They are preferably suitable for producing high-quality, scratchproof and chemical-resistant finishes on wood. In this application, straight after the evaporation of the water and without crosslinking, tack-free, dust-dry films are obtained having good mechanical load-bearing properties, such as high hardness, for example. Thus the pendulum hardness, measured in accordance with DIN 53157, of a film dried at 60° C. for 20 minutes is at least 20 s, preferably at least 30 s, in particular at least 40 s and, especially, 50 s. When the films are examined for their freedom from tack even prior to radiation curing, there is essentially no damage to the coating.

The polyurethanes can be crosslinked with high-energy radiation, such as UV radiation, electron beams, X-rays or γ radiation. Of these, UV curing is particularly preferred. It can be carried out, if desired, in the presence of customary photoinitiators, such as aromatic ketone compounds, such as benzophenone, alkylbenzo-phenones, Michler's ketone, anthrone, halogenated benzophenones, 2,4,6-trimethylbenzoyldiphenylphosphine oxide, phenylglyoxylic esters, anthraquinone and its derivatives, benzil ketals, hydroxyalkylphenones, etc. Mixtures of these compounds may also be employed here. The amount of photoinitiators employed is generally from about 0.01 to 20% by weight, preferably from 0.1 to 10% by weight, based on the solids content of the components to be cured.

The curing of the aqueous polymer dispersions can also, if desired, take place thermally by a free-radical mechanism with addition of the customary polymerization initiators. These include all compounds which under the conditions of curing break down into free radicals, examples being peroxides, hydroperoxides, hydrogen peroxide, persulfates, azo compounds and redox catalysts. The use of water-soluble initiators is preferred. In this context it is also possible to employ mixtures of different polymerization initiators: for example, mixtures of hydrogen peroxide and sodium or potassium peroxodisulfate. Organic peroxides suitable as initiators are described, for example, in EP-A-536 597. The amount of polymerization initiators employed is generally from about 0.01 to 5% by weight, based on the amount of the polyurethanes to be polymerized. Further suitable initiators are redox catalysts, comprising at least one of the abovementioned per compounds, for example, as oxidizing component and as reducing component, for example, ascorbic acid, glucose, sorbose, ammonium or alkali metal hydrogen sulfide, thiosulfate, hyposulfite, pyrosulfite or sulfide, metal salts, such as those of iron(II) ions or silver ions, or sodium hydroxymethylsulfoxylate.

The dried but not UV-cured films are generally notable for high coating hardness and/or good flexibility. Surprisingly, the flexibility of the coatings—especially those comprising an epoxy acrylate—goes up as the acrylate content of the hydroxyl-containing prepolymers A) employed in the novel polymer dispersions increases. The pendulum hardness of a film dried for about 20 minutes at elevated temperature, such as at about 60° C., is generally at least 20 s, preferably at least 30 s, in particular at least 40 s and, especially, at least 50 s. The pendulum hardness of a radiation-cured film one hour after radiation curing is generally at least 160 s. The UV-cured films obtained with the polyurethane dispersions of the invention exhibit essentially no deterioration in the pendulum hardness following radiation curing. Thus the pendulum hardness 12 hours after radiation curing is also generally at least 160 s. The flexibility was determined by measuring the Erichsen indentation in accordance with DIN 53156. In this case, surprisingly, even when using an aromatic polyisocyanate such as tolylene diisocyanate as component F), films of sufficient flexibility are obtained. The Erichsen indentation of a radiation-cured film of a polymer dispersion based on a polymer of the invention, then, 24 hours after UV curing is generally at least 3.0, preferably at least 3.5. It is also possible to achieve higher values, such as at least 4.0, preferably at least 5.0, for example. If at least one aliphatic and/or cycloaliphatic polyisocyanate is employed as component F) in preparing the polymers of the invention, films of good flexibility are obtained. In that case the Erichsen indentation of a radiation-cured film 24 hours after radiation curing is generally at least 6.5, preferably at least 7.0.

The films obtained from the curable polymer dispersions of the invention are generally scratchproof. Thus the pencil hardness of the films following radiation curing is at least 2H.

The polymer dispersions of the invention can be applied by customary techniques, such as spraying, rolling, knife coating, flow coating, brushing or dipping, onto a wide variety of substrates. The polymer dispersions of the invention can be employed as sole film-forming binder or combined with additives customary in coatings technology, such as binders, auxiliaries, pigments, dyes or matting agents, for example.

The invention additionally provides coating compositions comprising at least one polymer of the invention or an aqueous polymer dispersion. These coating compositions may if desired include a solvent mixture of water and at least one of the abovementioned water-miscible solvents. These coating compositions are preferably essentially free of organic solvents.

The invention is illustrated by the following nonlimiting examples.

EXAMPLES

The hydroxyl number is defined as mg of KOH/g of product. A suitable method of determining the hydroxyl number is described, for example, by J. Makes and J. Horky in Farbe und Lack, Vol. 94 (1988), p. 898 ff. It can likewise be determined ttitrimetrically in accordance with the following procedure:

1. Apparatus and auxiliaries
   Laboratory balance accurate to 0.01 g
   125 ml glass beakers
   Titroprocessor 636 (from Metrohm)
   Dosimat E 635, Dosimat 665 (from Metrohm)
   0.25 N methanolic KOH, acetic anhydride 5% strength in THF-dioxane (ratio 1:1), 4-dimethylaminopyridine (DMAP) 1% strength in THF dioxane
2. Procedure
   2.1 Blank value
   10 ml of DMAP solution are introduced using the Dosimat into a clean glass beaker, and then 5 ml of acetic anhydride solution are added. These components are left to react for 5 minutes, with the beaker covered, and then 1 ml of deionized water is added. After a further 10 minutes, 100 ml of a 1:1 mixture of THF-dioxane are added, and the mixture is subsequently titrated with 0.25 N methanolic KOH.
   2.2 Sample
   About 1 g of sample and 10 ml of 4-dimethylaminopyridine solution are introduced using the Dosimat 665 into a glass beaker. Then 5 ml of acetic anhydride solution are added and the solutions are left to react for 5 minutes, with the beaker covered. Following the addition of 100 ml of 1:1 THF-dioxane, the mixture is titrated with 0.25 N methanolic KOH.
3. Evaluation
   OH number [mg of KOH/g of substance]=(blank value ml−consumption sample ml)*56.1 g/mol*0.25 N*titer KOH/initial mass in g (solid)

The content of polar, functional groups, i.e., the carboxyl, phosphonate and sulfonate content, was determined from the initial mass of component B).

The solids content of the aqueous polymer dispersions was determined in accordance with DIN 53216 Part 1 (1 h, 125° C.).

The viscosity was determined in a Rheomat 30 in accordance with DIN 53019 at 23° C. with a shear rate $D=250\ s^{-1}$.

The weight-average particle diameter was determined by light scattering in a Malvern Autosizer C2 laser measuring device.

The isocyanate group content was determined titrimetrically. The initial sample mass varied depending on the expected NCO content (from 0 to 1.5% NCO: about 4 g; from 1.5 to 3.5%: about 2.5 g; from 3.5 to 7%: about 1 g). The sample was diluted with 100 ml of acetone. Then 10 ml of a dibutylamine solution were added and titration was carried out in the Titroprocessor with 0.1 mol/l hydrochloric acid. To prepare the dibutylamine solution, about 25 g of dibutylamine were made up to 1 l with N-methylpyrrolidone, and thorough stirring was carried out. To determine the blank value, 10 ml of this solution were titrated with 0.1 mol/l hydrochloric acid. The NCO content is calculated as follows: consumption blank value−consumption sample:initial mass×0.42=% NCO.

The double bond values are calculated values.

A) Polyurethane preparation

A 4-necked flask fitted with stirrer, dropping funnel, thermometer and reflux condenser was charged with hydroxyl containing unsaturated prepolymer in accordance with Table 1 and with the amounts stated in Table 2 of dimethylolpropionic acid, chain extender where applicable, acetone and dibutyltin dilaurate, and this initial charge was heated to reflux. Then a diisocyanate was added dropwise over the course 1 hour in a proportion in accordance with Table 2. The reaction mixture was stirred at reflux temperature until its isocyanate group content remained virtually constant. It was then cooled to 40° C. and neutralized with the amount of triethylamine stated in Table 2. After cooling to ambient temperature, the polyurethane solution was introduced with vigorous stirring into a mixture of ethylenediamine and water as per Table 2, where upon a dispersion formed spontaneously. The acetone was then distilled off under reduced pressure at 40° C. and the dispersion, finally, was adjusted to the desired solids content by dilution with water. The properties of the dispersions are shown in Table 3.

TABLE 1

Hydroxyl-containing prepolymers

| Pre-polymer | Type | OH number[1] [mg of KOH/g] |
|---|---|---|
| A | Polyester acrylate based on maleic acid | 80 |
| B | Mixture of 60% by weight A and 40% by weight bisphenol A diglycidyl ether diacrylate | 130 |
| C | Mixture of 40% by weight A and 60% by weight bisphenol A diglycidyl either diacrylate | 160 |
| D | Mixture of 26.7% by weight A and 73.3% by weight of a 70% strength solution of bisphenol A diglycidyl ether diacrylate in tripropylene glycol diacrylate | 130 |
| E | Polyester acrylate based on adipic acid | 80 |
| F | Mixture of 40% by weight E and 60% by weight bisphenol A diglycidyl ether diacrylate | 160 |
| G | Mixture of 83% by weight aliphatic polyurethane acrylate[2] and 17% by weight bisphenol A diglycidyl ether diacrylate | 44 |
| H | Mixture of 40% by weight aliphatic polyurethane acrylate[2] and 60% by weight bisphenol A diglycidyl ether diacrylate | 130 |
| I | Reaction product of polyether acrylate and bisphenol A diglycidyl ether diacrylate | 160 |
| K | Reaction product of 46% by weight polyether acrylate with 54% by weight bisphenol A diglycidyl ether diacrylate | 130 |

[1] of the individual compound or of the mixture, respectively
[2] as a 65% strength solution in tripropylene glycol diacrylate

TABLE 2

Polyurethane preparation

| Ex. No. | Pre-polymer from Tab. 1 [g] | Di-methylol-propionic acid [g] | Dibutyltin dilaurate [g] | Acetone [g] | Isocyanate [g] | Triethyl-amine [g] | Ethylene-diamine [g] | Chain extender [g] | Water [g] | Theoretical NCO content[4] [%] |
|---|---|---|---|---|---|---|---|---|---|---|
| C1 | 150 A | 15 | 0.22 | 129 | 24.0 HDI[1]<br>31.7 IPDI[2] | 11.2 | 3.6 | none | 515 | 1.44 |
| 1 | 150 B | 17 | 0.24 | 131 | 30.8 HDI<br>40.7 IPDI | 12.7 | 3.6 | none | 416 | 1.39 |
| 2 | 150 C | 17 | 0.24 | 131 | 33.7 HDI<br>44.5 IPDI | 12.7 | 3.6 | none | 556 | 1.32 |
| 3 | 150 C | 17 | 0.24 | 131 | 69.8 TDI[3] | 12.7 | 3.6 | none | 389 | 1.37 |
| 4 | 150 D | 20 | 0.26 | 134 | 67.1 TDI | 15.2 | 3.6 | none | 597 | 1.36 |
| C2 | 150 E | 15 | 0.22 | 129 | 24.0 HDI<br>31.7 IPDI | 11.2 | 3.6 | none | 353 | 1.44 |
| 5 | 150 F | 17 | 0.24 | 131 | 33.7 HDI<br>44.5 IPDI | 12.7 | 3.6 | none | 531 | 1.32 |
| C3 | 204 G | 15 | 0.22 | 172 | 22.7 HDI<br>30.5 IPDI | 11.2 | 3.6 | none | 430 | 1.69 |
| 6 | 150 H | 17 | 0.24 | 131 | 30.4 HDI<br>40.2 IPDI | 12.7 | 3.6 | none | 493 | 1.39 |
| 7 | 74.9 I | 11 | 0.13 | 67.5 | 21.7 HDI[1]<br>28.6 IPDI[2] | 8.29 | 3.6 | none | 275 | 2.84 |
| 8 | 74.9 I | 15 | 0.15 | 70.6 | 24.0 HDI<br>31.7 IPDI | 11.2 | 3.6 | none | 481 | 2.33 |
| 9 | 150 K | 20.1 | 0.26 | 134 | 32.3 HDI<br>42.6 IPDI | 15.2 | 3.6 | none | 490 | 1.33 |
| 10 | 150 K | 20.1 | 0.26 | 134 | 66.8 TDI[3] | 15.2 | 3.6 | none | 417 | 1.19 |
| 11 | 150 K | 20.1 | 0.27 | 141 | 68.4 TDI | 15.2 | 3.6 | 9.00 PE diol[6] | 400 | 1.30 |
| 12 | 150 K | 20.1 | 0.27 | 137 | 67.6 TDI | 15.2 | 3.6 | 4.50 PE diol[6] | 391 | 1.33 |
| 13 | 150 K | 20.1 | 0.27 | 137 | 58.0 TDI<br>19.7 HDI isocyanurate | 15.2 | 3.6 | 4.50 PE diol[6] | 632 | 1.29 |
| 14 | 150 K | 20.1 | 0.27 | 137 | 67.2 TDI | 15.2 | 3.6 | 4.50 PE diol[7] | 392 | 1.33 |
| 15 | 150 K | 20.1 | 0.26 | 139 | 71.9 TDI | 15.2 | 3.6 | 4.50 PE diol[6]<br>2.25 BD 1.4[8] | 401 | 1.30 |
| 16 | 150 K | 20.1 | 0.26 | 134 | 66.8 TDI | 20 g NaOH 30% strength[5] | 3.6 | none | 561 | 1.36 |
| 17 | 150 K | 20.1 | 0.26 | 134 | 66.8 TDI | 10.6 | 3.6 | none | 377 | 1.36 |

[1] hexamethylene diisocyanate
[2] isophorone diisocyanate
[3] isomer mixture of 80% 2,4- and 20% 2,6-tolylene diisocyanate
[4] before adding ethylenediamine and any further chain extender
[5] instead of triethylamine
[6] polyester of isophthalic acid, adipic acid and hexanediol, Mn = 1000
[7] polyester of isophthalic acid, adipic acid and hexanediol, Mn = 2000
[8] 1,4-butanediol B) Properties of the dried and UV-cured films The film data were determined on films applied using a film drawing frame (gap height 200 µm). The photoinitiator used was Irgacure 500 (liquid formulation of benzophenone and 1-hydroxycyclohexyl phenyl ketone from Ciba-Geigy), which was incorporated by stirring in an amount of 4% relative to the solids content of the dispersion. The pendulum hardness prior to UV was measured after drying the film at 60° C. for 20 minutes and then cooling it to 20° C. After 14 days of storage, the dispersion C3 formed two phases, and therefore lacked long-term stability.

1. Pencil hardness (24 h after UV curing):
The results are given in Table 3.

2. Pendulum hardness:
The coating hardness was characterized by determining the pendulum attenuation in analogy to DIN 53157. For this purpose the radiation-curable compositions of the novel examples and of the comparative examples were applied to glass using a film drawing frame with a gap height of 200 µm. The sample thus obtained was dried at 60° C. for 20 minutes in order to cure it, and the pendulum attenuation was determined prior to UV curing. The films were then passed twice in front of a high-pressure mercury vapor source (120 W/cm) at a distance of 10 cm and at a belt speed of 10 m/min. The pendulum attenuation after UV curing was then determined using a pendulum device in accordance with DIN 53157 (König). The results are stated in seconds and are summarized in Table 3.

3. Erichsen indentation (24 h after UV curing):
The flexibility of the coating was determined by measuring the Erichsen indentation in analogy to DIN 53156. For this purpose the respective preparation was applied to BONDER panel 26S600 C using a film drawing frame with a gap height of 200 µm. For curing, the film was exposed as described above to a high-pressure mercury vapor source (120 W/cm). The Erichsen indentation was determined subsequently by pressing a metal ball into the uncoated side of the panel (DIN 53156). The results are summarized in Table 3.

3. A polymer as claimed in claim 1, wherein the content of polymerizable α,β-ethylenically unsaturated double bonds lies within a range from 1.0 to 4.0 mol per 1000 g of polymer.

| Ex. No. | Solids content [g] | Hydroxyl number [mg of KOH/g] | Carboxyl content [% by wt.] | Viscosity [mPas] [mPas] | Particle diameter [nm] | pH | Pencil hardness after UV curing | Pendulum hardness before UV curing [s] | Pendulum hardness after UV 1 h/12 h [s] | Erichsen identation after UV curing | Double bond content[1] [mol/1000 g] |
|---|---|---|---|---|---|---|---|---|---|---|---|
| C1 | 33 | 80 | 2.08 | 16.0 | 266 | 7.87 | 2H | 17 | 152/157 | 6.4 | 2.67 |
| 1 | 38 | 130 | 2.19 | 491 | 179 | 8.02 | 2H | 24 | 174/172 | 6.5 | 2.39 |
| 2 | 32 | 160 | 2.13 | 609 | 175 | 8.07 | 2H | 57 | 177/182 | 8.0 | 2.34 |
| 3 | 40 | 160 | 2.20 | 547 | 198 | 7.90 | 4H | 133 | 192/198 | 3.6 | 2.36 |
| 4 | 30 | 130 | 2.57 | 1467 | 1921 | 8.27 | 5H | 89 | 205/216 | 5.8 | 2.67 |
| C2 | 40 | 80 | 2.08 | 217 | 1157 | 7.85 | H | 15 | 126/116 | 6.9 | 2.61 |
| 5 | 33 | 160 | 2.13 | 1119 | 102 | 8.14 | 2H | 56 | 178/177 | 7.0 | 2.31 |
| C3 | 40 | 44 | 1.71 | | | | no stable dispersion | | | | 2.23 |
| 6 | 34 | 130 | 2.19 | 2052 | 431 | 8.12 | 2H | 98 | 160/163 | 8.4 | 2.07 |
| 7 | 35 | 160 | 2.44 | 1742 | 100 | 8.21 | 4H | 116 | 198/183 | 7.8 | 2.22 |
| 8 | 25 | 160 | 3.06 | 789 | 1082 | 7.90 | 4H | 137 | 166/180 | 8.4 | 2.05 |
| 9 | 35 | 130 | 2.50 | 696 | 286 | 8.05 | 4H | 20 | 174/171 | 6.5 | 2.99 |
| 10 | 38 | 130 | 2.57 | 317 | 194 | 8.31 | 4H | 88 | 181/188 | 4.1 | 3.08 |
| 11 | 40 | 129 | 2.48 | 73.6 | 163 | 7.74 | 4H | 35 | 191/191 | 5.2 | 2.79 |
| 12 | 40 | 130 | 2.52 | 294 | 208 | 8.25 | 4H | 85 | 176/192 | 6.9 | 3.02 |
| 13 | 30 | 130 | 2.43 | 821 | >1000 | 8.54 | 4H | 132 | 184/193 | 7.1 | 2.91 |
| 14 | 40 | 128 | 2.52 | 560 | 254 | 8.30 | 4H | 95 | 175/185 | 6.8 | 3.02 |
| 15 | 40 | 145 | 2.46 | 196 | 147 | 8.28 | 4H | 88 | 183/198 | 5.4 | 2.95 |
| 16 | 30 | 130 | 2.67 | 895 | >1000 | 8.66 | 4H | 90 | 173/179 | 6.1 | 3.18 |
| 17 | 40 | 130 | 1.84 | 46.9 | >1000 | 7.22 | 4H | 42 | 180/190 | 4.6 | 3.14 |

[1] based on the solids content (calculated)

We claim:

1. A curable polyurethane polymer which comprises in copolymerized form
   A) from 40 to 80% by weight, based on the overall weight of components A) to F), of at least one hydroxyl-containing prepolymer having at least one free-radically or photochemically polymerizable α,β-ethylenically unsaturated double bond, where the prepolymer is selected from the group consisting of polyether acrylates, epoxy acrylates, reaction products and mixtures thereof, and the hydroxyl number of the prepolymer lies within a range from 121 to 300 mg of KOH/g,
   B) from 0.1 to 20% by weight, based on the overall weight of components A) to F), of at least one compound having at least one isocyanate-reactive hydroxyl group and/or primary or secondary amino group and, in addition, at least one polar functional group,
   C) from 0.1 to 10% by weight, based on the overall weight of components A) to F), of at least one compound selected from diamines, polyamines and mixtures thereof,
   D) from 0 to 20% by weight, based on the overall weight of components A) to F), of at least one further compound other than A), B), C) and E), having at least two isocyanate-reactive groups, which are hydroxyl groups and mixtures of hydroxyl groups and/or primary or secondary amino groups,
   E) from 0 to 20% by weight, based on the overall weight of components A) to F), of at least one compound having an isocyanate-reactive group,
   F) from 10 to 50% by weight, based on the overall weight of components A) to F), of at least one polyisocyanate, or a salt thereof.

2. A polymer as claimed in claim 1, wherein the sum of the hydroxyl numbers of components A) and D) lies within a range from 123 to 250 mg of KOH/g.

4. A polymer as claimed in claim 1, wherein the content of polar functional groups lies within a range from 1.3 to 3.5% by weight, based on the overall weight of components A) to F).

5. A polymer as claimed in claim 1, wherein the prepolymer A) is a reaction product or a mixture of
   a) at least one polyether acrylate and
   b) at least one epoxy acrylate.

6. A polymer dispersion comprising at least one curable polymer as claimed in claim 1 in dispersed form.

7. A polymer dispersion as claimed in claim 6, wherein the pendulum hardness of a film dried at 60° C. for 20 minutes is at least 20 s.

8. A polymer dispersion as claimed in claim 6, wherein the pendulum hardness of a radiation-cured film one hour after radiation curing is at least 160 s.

9. A polymer dispersion as claimed in claim 6, wherein the Erichsen indentation of a radiation-cured film 24 hours after radiation curing is at least 3.0, if at least one aromatic polyiso-cyanate is employed as component F) and is at least 6.5, if at least one aliphatic and/or cycloaliphatic polyisocyanate is employed as component F).

10. A coating composition which comprises at least one polymer as claimed in claim 1.

11. A water-based coating composition which comprises at least one aqueous polymer dispersion as claimed in claim 6.

12. A coating composition as claimed in claim 11 which is essentially free of organic solvents.

13. A process for preparing a curable polyurethane polymer as claimed in claim 1, which comprises
   a) reacting components A), B), F) and, if desired, D) and/or E) to give an isocyanate-functional polyurethane prepolymer,
   b) ionizing any ionogenic polar functional groups by neutralization and/or quaternization, c) reacting the isocyanate-functional prepolymer with component C) and, if desired, with component E) to give a product which is essentially free of isocyanate groups and, if desired, dispersing said product with water, and, if desired, d) drying the reaction product from step c).

14. A process as claimed in claim 13, which comprises as step d) drying the reaction product from step c) by means of spray drying.

15. A polymer as claimed in claim 1, wherein the prepolymer A) comprises at least one polyether acrylate.

* * * * *

UNITED STATES PATENT AND TRADEMARK OFFICE
CERTIFICATE OF CORRECTION

PATENT NO. : 6,207,744 B1
DATED : March 27, 2001
INVENTOR(S) : Paulus et al.

It is certified that error appears in the above-identified patent and that said Letters Patent is hereby corrected as shown below:

Title page,
Item [54], and at the top of Column 1, the title is incorrect. It should read:

[54] CURABLE POLYURETHANE POLYMER, DISPERSION BASED ON THIS POLYMER, PROCESSES FOR PREPARING THE DISPERSION, AND ITS USE

Item [75], the 5th inventor is omitted. Item [75] should read:

[75] Inventors: Wolfgang Paulus, Mainz; Werner Lebkücher, Friedelsheim; Rainer Königer, Ludwigshafen; Wolfgang Reich, Maxdorf; Klaus Menzel, Möglingen, all of (DE)

Signed and Sealed this

Twenty-third Day of October, 2001

*Attest:*

*Attesting Officer*

NICHOLAS P. GODICI
*Acting Director of the United States Patent and Trademark Office*